(12) United States Patent
Ishii et al.

(10) Patent No.: US 11,648,611 B2
(45) Date of Patent: May 16, 2023

(54) SINTERED OIL-IMPREGNATED BEARING (71) Applicant: Diamet Corporation, Niigata (JP)

(72) Inventors: Yoshinari Ishii, Niigata (JP); Tsuneo Maruyama, Niigata (JP)

(73) Assignee: Diamet Corporation, Niigata (JP)

(*) Notice: Subject to any disclaimer, the term of this patent is extended or adjusted under 35 U.S.C. 154(b) by 351 days.

(21) Appl. No.: 16/641,920

(22) PCT Filed: Sep. 20, 2018

(86) PCT No.: PCT/JP2018/034712
§ 371 (c)(1),
(2) Date: Feb. 25, 2020

(87) PCT Pub. No.: WO2019/059248
PCT Pub. Date: Mar. 28, 2019

(65) Prior Publication Data
US 2020/0180032 A1    Jun. 11, 2020

(30) Foreign Application Priority Data
Sep. 20, 2017  (JP) .............................. JP2017-180541

(51) Int. Cl.
B22F 5/00    (2006.01)
B22F 3/10    (2006.01)
(Continued)

(52) U.S. Cl.
CPC .............. B22F 3/1035 (2013.01); B22F 5/00 (2013.01); C22C 1/0475 (2013.01);
(Continued)

(58) Field of Classification Search
CPC ...................................................... B22F 5/00
See application file for complete search history.

(56) References Cited

U.S. PATENT DOCUMENTS

2012/0177528 A1    7/2012  Takayama
2013/0236134 A1    9/2013  Lee
(Continued)

FOREIGN PATENT DOCUMENTS

CN    102913555 A    2/2013
CN    104755775 A    7/2015
(Continued)

OTHER PUBLICATIONS

Hu Lei et al., "Effect of manganese content on microstructure and properties of Fe—Cu—Mn—C sintering alloy", *Materials Science and Engineering of Powder Metallurgy*, Dec. 2013, vol. 18, No. 6.
(Continued)

*Primary Examiner* — Christopher S Kessler
(74) *Attorney, Agent, or Firm* — Leason Ellis LLP; Melvin C. Garner; Mitsuhiro Haraguchi (57) ABSTRACT Provided is a novel sintered oil-impregnated bearing superior in wear resistance and cost performance under a severe use condition where the bearing collides with a shaft due to a high load and vibration, such as a condition associated with an output shaft of an electric motor installed in a vehicle and a wiper motor installed therein. The sintered oil-impregnated bearing contains: 15 to 30% by mass of Cu; 1 to 4% by mass of C; and a remainder consisting of Fe and inevitable impurities, in which a metal structure with copper being melted therein is provided at least on a bearing surface; pearlite or a pearlite with ferrite being partially scattered therein is provided in a matrix; a copper-rich phase arranged in a mesh-like manner is also provided in the matrix; and a free graphite is dispersed and distributed in the matrix as well.

5 Claims, 3 Drawing Sheets (51) Int. Cl.
*C22C 1/04* (2023.01)
*C22C 33/02* (2006.01)
*C22C 38/16* (2006.01)
*C22C 38/00* (2006.01)
*B22F 1/052* (2022.01)

(52) U.S. Cl.
CPC .......... *C22C 33/0278* (2013.01); *C22C 38/16* (2013.01); *B22F 1/052* (2022.01); *B22F 2005/004* (2013.01); *C22C 38/008* (2013.01)

(56) References Cited

U.S. PATENT DOCUMENTS

| | | |
|---|---|---|
| 2014/0294654 A1 | 10/2014 | Tokushima |
| 2015/0285300 A1 | 10/2015 | Ito et al. |

FOREIGN PATENT DOCUMENTS

| | | |
|---|---|---|
| EP | 2357258 A2 | 8/2011 |
| EP | 2372179 A2 | 10/2011 |
| JP | 01-176052 A | 7/1989 |
| JP | 08-109450 A | 4/1996 |
| JP | 11-117940 A | 4/1999 |
| JP | 2001-123253 A | 5/2001 |
| JP | 2004-018940 A | 1/2004 |
| JP | 2004-360731 A | 12/2004 |
| JP | 2010-077474 A | 4/2010 |
| JP | 2011-042817 A | 3/2011 |
| JP | 2012-162771 A | 8/2012 |
| WO | WO-2006/080554 A1 | 8/2006 |

OTHER PUBLICATIONS

Extended European Search Report dated Dec. 15, 2020 for the corresponding European Patent Application No. 18859131.7.
International Search Report dated Nov. 13, 2018 for the corresponding PCT International Patent Application No. PCT/JP2018/034712.

SINTERED OIL-IMPREGNATED BEARING

CROSS-REFERENCE TO RELATED PATENT APPLICATIONS

This application is a U.S. National Phase Application under 35 U.S.C. § 371 of International Patent Application No. PCT/JP2018/034712, filed Sep. 20, 2018, and claims the benefit of priority to Japanese Patent Application No. 2017-180541, filed Sep. 20, 2017, all of which are incorporated by reference herein in their entireties. The International Application was published in Japanese on Mar. 28, 2019 as International Publication No. WO/2019/059248 under PCT Article 21(2).

FIELD OF THE INVENTION

The present invention relates to a sintered oil-impregnated bearing used under a high-load use condition such as that associated with a motor in a vehicle or the like, the sintered oil-impregnated bearing having a superior wear resistance and a lower attackability against other members.

BACKGROUND OF THE INVENTION

Sintered oil-impregnated bearings are employed even under a condition(s) involving a relatively high load, such as a condition associated with an output shaft of an electric motor installed in a vehicle and a wiper motor installed therein. In recent years, as parts used in vehicles have become smaller and lighter, bearings of motors or the like used in these parts have become smaller as well such that a surface pressure or load applied to a bearing has become higher than before. Further, the problem with the conventional bearings used in these motors is that in addition to the fact that a bearing often collides with a shaft due to vehicle vibration, the use condition has now become more severe than before, which has led to an insufficient wear resistance.

In order to reduce the wear incurred by such high load and the collision with a shaft, improvements in strength and lubricity of a sintered bearing material are now being considered. As a bearing material having a high strength, there are known an iron-graphite-based material and an iron-copper-graphite-based material. However, these materials are such that depending on a sintering condition(s), a large amount of a hard cementite may be precipitated by the reaction between iron and graphite so that wear may progress as a mating shaft member will be damaged thereby; and are such that even with the precipitation of a hard cementite being suppressed by performing sintering at a low temperature at which iron and graphite are less likely to react with each other, the strength of a bearing may be insufficient so that the bearing will be worn due to a collision incurred by a high load and vibration.

Here, as an iron-based bearing material capable of ensuring both the strength of the bearing material and the suppression of the precipitation of cementite, there is known an iron-based sintered sliding member capable of ensuring its strength while having the precipitation of cementite suppressed, the iron-based sintered sliding member being produced by adding manganese to an alloy component, and then performing sintering at a high temperature of 1,000 to 1,100° C. (Patent document 1). Further, as an iron-based sintered material, there is known an iron-based sintered bearing whose gross composition as a sintered alloy is Cu: 2.0 to 9.0% by mass, C:1.5 to 3.7% by mass, remainder: Fe and inevitable impurities (Patent document 2). Particularly, the inner region of this bearing has a metal structure in which in an iron alloy phase consisting of 20 to 85% of ferrite by area ratio and pearlite, there are dispersed and distributed a copper phase extended in a direction orthogonal to an axial direction of the bearing; a graphite phase; and pores. Further, on a bearing surface of this bearing, the copper phase is exposed at an area ratio of 8 to 40%.

However, the iron-based sliding member disclosed in Patent document 1 has a high percentage of iron in its material; upon collision due to a high load and vibration, since a mating shaft member is also a steel member, adhesion which is likely to occur between same type of metal shall make it difficult to restrict the wear of the bearing and the shaft. Moreover, in the case of the iron-based sintered bearing disclosed in Patent document 2, a sintering temperature employed is low such that an insufficient material strength is exhibited, thus making it difficult to deal with the collision incurred by a high load and vibration.

PRIOR ART DOCUMENT

Patent Documents

Patent document 1: JP-A-2011-42817
Patent document 2: JP-A-2010-77474

SUMMARY OF THE INVENTION

Problem to be Solved by the Invention

In this regard, it is an object of the present invention to provide a novel sintered oil-impregnated bearing superior in wear resistance and cost performance under a severe use condition where the bearing collides with a shaft due to a high load and vibration, such as a condition associated with an output shaft of an electric motor installed in a vehicle and a wiper motor installed therein.

Means to Solve the Problem

In order to solve the aforementioned problems, the inventors of the present invention diligently conducted a study and arrived at the invention as follows. That is, the inventors found that a high strength could be ensured by suppressing cementite precipitation in a matrix of the sintered oil-impregnated bearing, and by dispersing and distributing, in the matrix, pearlite or a pearlite with ferrite being partially scattered therein; and that a lubricity could be improved by dispersing and distributing, in the matrix, a copper-rich phase arranged in a mesh-like manner and a free graphite.

Specifically, the sintered oil-impregnated bearing of the present invention contains:
15 to 30% by mass of Cu;
1 to 4% by mass of C; and
a remainder consisting of Fe and inevitable impurities, in which a metal structure with copper being melted therein is provided at least on a bearing surface; pearlite or a pearlite with ferrite being partially scattered therein, a copper-rich phase and a free graphite are all provided in a matrix.

Further, the copper-rich phase is distributed in the matrix in a mesh-like manner, and the free graphite is dispersed and distributed in the matrix.

The sintered oil-impregnated bearing further contains at least one of Sn or Zn by an amount of not larger than 4% by mass.

Further, the copper-rich phase is dispersed and distributed in the matrix at an area ratio of 7 to 25%.

Further, the free graphite is dispersed and distributed in the matrix at an area ratio of 5 to 25%.

Further, the sintered oil-impregnated bearing has a porosity of 12 to 30%.

Effects of the Invention

The sintered oil-impregnated bearing of the present invention contains: 15 to 30% by mass of Cu; 1 to 4% by mass of C; and the remainder consisting of Fe and inevitable impurities, in which the metal structure with copper being melted therein is provided at least on the bearing surface; pearlite or the pearlite with ferrite being partially scattered therein, the copper-rich phase and the free graphite are all provided in the matrix. In this way, the strength of the bearing material can be controlled to an appropriate range, and a lubricity can be imparted to the bearing material, thereby bringing about an excellent wear resistance and cost performance under a severe use condition where the bearing collides with a shaft due to a high load and vibration, such as a condition associated with an output shaft of an electric motor installed in a vehicle and a wiper motor installed therein.

DETAILED DESCRIPTION OF THE INVENTION

The sintered oil-impregnated bearing of the present invention contains 15 to 30% by mass of Cu; 1 to 4% by mass of C; and a remainder consisting of Fe and inevitable impurities, in which a metal structure with copper being melted therein is provided at least on a bearing surface. Further, a high strength is secured by providing, in a matrix, pearlite or a pearlite with ferrite being partially scattered therein; and a lubricity is improved by providing, in the matrix, a copper-rich phase and a free graphite. Furthermore, in order to improve lubricity, it is preferred that the copper-rich phase be distributed in the matrix in a mesh-like manner, and that the free graphite be dispersed and distributed in the matrix.

Here, the term "copper-rich phase" refers to a phase containing copper by an amount of not smaller than 85% by mass; or a phase containing copper and Sn or Zn all together by an amount of not smaller than 85% by mass, if Sn or Zn is contained as well. Further, as for the copper-rich phase, the term "mesh-like" refers to a pattern or shape where multiple lines are crossed in a mesh-like manner. Furthermore, the copper-rich phase is distributed in a way such that in the matrix, the copper-rich phase surrounds pearlite or the pearlite with ferrite being partially scattered therein. In this way, it looks as if the copper-rich phase is distributed in a mesh-like manner.

Here, it is generally known that in the case of an iron-copper-carbon-based sintered material, the material strength and size precision thereof can be significantly affected by a sintering condition(s). An iron-copper-carbon-based sintered member is produced by compacting a raw material powder mixed at a given composition, performing sintering, and then carrying out a sizing step. Since a copper powder is used in the raw material, and sintering is performed at a temperature not lower than the melting point of copper, solid dissolution and sintering of the copper and carbon shall proceed into the iron so that the material strength can be improved. However, since the sintering reaction between iron and graphite can take place easily, a temperature not lower than the melting point of copper will make it difficult to allow the free graphite to exist in the matrix. There, by limiting the composition of the raw material powder, and also optimizing the average particle sizes of and the sintering temperature conditions for a copper powder and a graphite powder that are used as raw material powders, there can be obtained the sintered oil-impregnated bearing of the present invention having, at least on the bearing surface, metal structure with copper being melted therein; and having, in the matrix, pearlite or the pearlite with ferrite being partially scattered therein, the copper-rich phase and the free graphite.

As the copper powder, an electrolytic copper powder and/or an atomized copper powder can be used. It is easier for a melted copper to form the copper-rich phase if using a copper powder having an average particle size of 50 to 100 μm which is larger than that of a copper powder generally used for powder metallurgy. Further, by controlling the sintering temperature condition to a temperature higher than the melting point of copper (1083° C.) i.e. a temperature of 1085 to 1105° C., the copper-rich phase provided in the mesh-like manner can be formed.

Meanwhile, as the graphite powder, there can be listed, for example, a crystalline graphite powder, a flake graphite powder and an amorphous graphite powder as natural graphites; as well as artificial graphite powders. Here, since the lubricity of a graphite can be affected by the degree of crystal growth, it is preferred that the sintered oil-impregnated bearing of the present invention employ at least one of a natural crystalline graphite powder and flake graphite powder having a fine crystallinity and a superior lubricity. Further, by using, as the raw material powder, at least one of a crystalline graphite powder and flake graphite powder having an average particle size of 20 to 100 μm, and performing sintering at 1085 to 1105° C. as above, part of the graphite will react with an iron powder so that pearlite or the pearlite with ferrite being partially scattered therein will be formed, thus making it possible to suppress cementite precipitation. At the same time, the matrix will turn into a metal structure with the free graphite being dispersed and distributed therein.

Particularly, the average particle sizes of the copper powder and the graphite powder are those calculated based on particle size distribution measurement values that are obtained via a laser diffraction method. As a laser diffraction-type particle size distribution measurement device, there can be used, for example, SALD3000 by Shimadzu Corporation.

Described in detail hereunder is the composition and other features of the sintered oil-impregnated bearing of the present invention.

(1) Cu: 15 to 30% by Mass

Cu melts at the time of sintering so as to form the mesh-like copper-rich phase in the matrix, and reacts with Fe in the matrix so as to form a solid solution consisting of Cu, Fe and C. The mesh-like copper-rich phase is softer than a mating shaft, which improves a conformability with the mating shaft. In addition, the solid solution that consists of Cu, Fe and C, and is formed by the reaction between Cu and Fe in the matrix, has a structure of pearlite or the pearlite with ferrite being partially scattered therein, thereby bringing about an effect of improving the material strength. These two effects contribute to an improvement in the wear resistance of the bearing. However, it is not preferable when the amount of Cu contained is greater than 30% by mass, because an insufficient material strength will be exhibited such that the bearing will be worn more significantly under a condition where the bearing collides with the shaft due to a high load and vibration.

(2) Graphite (C): 1 to 4% by Mass

Graphite (C) imparts a superior lubricity to the bearing by being dispersed and distributed as the free graphite in the matrix of a bearing alloy. Further, Graphite (C) reacts with Fe to form the solid solution consisting of Cu, Fe and C. The solid solution has a structure of pearlite or the pearlite with ferrite being partially scattered therein, thereby bringing about an effect of improving the strength of the bearing. These two effects contribute to an improvement in the wear resistance of the bearing, and a reduction in friction coefficient. It is not preferable when the amount of graphite (C) contained is smaller than 1% by mass, because the desired effects cannot be achieved. Meanwhile, it is also not preferable when the amount of graphite (C) contained is greater than 4% by mass, because the strength of the bearing will deteriorate significantly.

(3) Porosity: 12 to 30%

Pores are dispersed in the matrix to buffer a strong friction to which the bearing is subjected, and retain a lubricant oil. When sliding against the mating shaft, the lubricant oil will be supplied from the pores to a sliding surface with the mating shaft, thereby reducing the friction coefficient, and thus restricting the wear of the bearing. It is not preferable when a porosity is lower than 12%, because the effect thereof will be insufficient. Meanwhile, it is also not preferable when the porosity is greater than 30%, because the material strength will deteriorate significantly.

(4) Copper Powder: Average Particle Size 50 to 100 μm

As a copper powder used as the raw material powder, at least one of an electrolytic copper powder and an atomized copper powder is preferably used. The copper powder melts at the time of sintering so as to form the mesh-like copper-rich phase in the matrix, and reacts with Fe in the matrix so as to form the solid solution consisting of Cu, Fe and C. The mesh-like copper-rich phase is softer than a mating shaft, which improves the conformability with the mating shaft. In addition, the solid solution that consists of Cu, Fe and C, and is formed by the reaction between the copper powder and Fe in the matrix, has a structure of a pearlite with cementite precipitation being suppressed; or the pearlite with ferrite being partially scattered therein, thereby bringing about an effect of improving the material strength. These two effects contribute to an improvement in the wear resistance of the bearing. It is not preferable when the average particle size of the copper powder is smaller than 50 μm, because the desired effects cannot be achieved. Meanwhile, it is also not preferable when the average particle size of the copper powder is greater than 100 μm, because sintering cannot proceed smoothly such that an insufficient material strength will be exhibited, and that the bearing will thus be worn more significantly under a condition where the bearing collides with the shaft due to a high load and vibration.

(5) Graphite Powder: Average Particle Size 20 to 100 μm

As a graphite powder used as the raw material powder, at least one of a crystalline graphite powder and a flake graphite powder is preferably used. The graphite powder imparts a superior lubricity to the bearing by being dispersed and distributed as the free graphite in the matrix of the bearing alloy. Further, the graphite powder reacts with Fe to form the solid solution consisting of Cu, Fe and C. The solid solution has a structure of a pearlite with cementite precipitation being suppressed; or the pearlite with ferrite being partially scattered therein, thereby bringing about an effect of improving the strength of the bearing. These two effects contribute to an improvement in the wear resistance of the bearing, and a reduction in friction coefficient. It is not preferable when the average particle size of the graphite powder is smaller than 20 μm, because the amount of the free graphite in the matrix will decrease as the graphite powder reacts with the iron powder in the raw material powder when performing sintering, which makes it impossible to achieve the effect of the graphite powder. Meanwhile, it is also not preferable when the average particle size of the graphite powder is greater 100 μm, because the material strength will deteriorate significantly.

(6) Sintering Temperature: 1085 to 1105° C.

A sintering temperature is critical in producing the sintered oil-impregnated bearing of the present invention. That is, by controlling the sintering temperature, there can be produced the sintered oil-impregnated bearing of the present invention having, at least on the bearing surface, the metal structure with copper being melted therein; having, in the matrix, pearlite or the pearlite with ferrite being partially scattered therein; having, in the matrix, the copper-rich phase arranged in the mesh-like manner; and having, in the matrix, the metal structure with the free graphite being dispersed and distributed therein. It is not preferable when the sintering temperature is lower than 1085° C., because copper will melt in an insufficient manner such that it cannot satisfactorily react with Fe in the matrix, thus resulting in a deterioration in strength and a more significant degree of bearing wear accordingly. Meanwhile, it is also not preferable when the sintering temperature is greater than 1105° C., because the amount of the free graphite will decrease such that a satisfactory lubricating effect cannot be achieved, and that a large amount of cementite will be precipitated.

(7) Area Ratio of Copper-Rich Phase: 7 to 25%

The mesh-like copper-rich phase is softer than a mating shaft, which improves a conformability with the mating shaft. It is not preferable when an area ratio of the copper-rich phase is lower than 7%, because the desired effects cannot be achieved. Meanwhile, it is also not preferable when the area ratio of the copper-rich phase is greater than 25%, because the strength of the bearing will deteriorate.

(8) Area Ratio of Free Graphite: 5 to 25%

Free graphite imparts a superior lubricity to the bearing by being dispersed and distributed in the matrix of the bearing alloy. It is not preferable when an area ratio of the free graphite is lower than 5%, because the desired effects cannot be achieved. Meanwhile, it is also not preferable when the area ratio of the free graphite is greater than 25%, because the strength of the bearing will deteriorate.

(9) At Least One of Sn or Zn: Not Larger than 4% by Mass

Together with Cu, Sn or Zn forms, in the matrix, the copper-rich phase arranged in the mesh-like manner so as to improve the material strength, thus bringing about an effect of improving wear resistance. It is not preferable when the amount of Sn and/or Zn is greater than 4% by mass, because a greater degree of wear will actually be observed.

Described hereunder are specific working examples of the sintered oil-impregnated bearing of the present invention. Here, the present invention shall not be limited to the following examples, but may be practiced in various modified fashions.

WORKING EXAMPLE

As a raw material powder(s), there were prepared a reduced iron powder for powder metallurgy, an electrolytic copper powder and a graphite powder. Particularly, as a copper powder, an electrolytic copper powder having a given average particle size was used, except that in comparative example 5, an atomized copper powder having a small average particle size was used; and that in comparative example 6, an electrolytic copper powder having a large average particle size was used. As a graphite powder, a crystalline graphite powder or flake graphite powder having a given average particle size was used, except that in comparative example 7, an artificial graphite powder having a small average particle size was used; and that in comparative example 8, a crystalline graphite powder or flake graphite powder having a large average particle size was used.

These raw material powders were mixed together so that a final component composition(s) shown in Table 1 could be achieved. A zinc stearate was then added thereto by an amount of 0.5%, followed by using a V-type mixer to mix the ingredients for 20 min so as to obtain a mixed powder. A green compact was then produced by press molding. Next, in an endothermic gas (endothermic gas) atmosphere prepared by mixing a natural gas with air, and then passing them through a heated catalyst for degradation and conversion, the green compact was sintered at a given temperature in a range of 1085 to 1105° C., thus obtaining a sintered body. Later, sizing was performed at a given pressure, followed by impregnating the sintered body with a synthetic hydrocarbon-based lubricant oil. In this way, there were produced ring-shaped test specimens of an iron-copper based sintered oil-impregnated bearing, each having a size of outer diameter: 18 mm×inner diameter: 8 mm×height: 8 mm, having the component composition(s) shown in Table 1, and having the free graphite dispersed and distributed in the matrix.

TABLE 1

| Bearing | | Composition (mass %) | | | | | | Copper powder Average particle size μm | Graphite powder Average particle size μm | Sintering temperature ° C. |
|---|---|---|---|---|---|---|---|---|---|---|
| | | Copper powder | Graphite powder | Sn | Cu-30% Zn | Iron powder | Total | | | |
| Example of the invention | 1 | 15 | 4 | — | — | 81 | 100 | 97 | 85 | 1085 |
| | 2 | 17 | 3 | — | — | 80 | 100 | 88 | 85 | 1090 |
| | 3 | 19 | 2 | — | — | 79 | 100 | 88 | 27 | 1090 |
| | 4 | 21 | 3 | — | — | 76 | 100 | 88 | 43 | 1090 |
| | 5 | 23 | 2 | — | — | 75 | 100 | 62 | 43 | 1095 |
| | 6 | 25 | 2 | — | — | 73 | 100 | 54 | 21 | 1095 |
| | 7 | 25 | 2 | — | — | 73 | 100 | 97 | 27 | 1100 |
| | 8 | 27 | 4 | — | — | 69 | 100 | 45 | 85 | 1105 |
| | 9 | 30 | 1 | — | — | 69 | 100 | 88 | 43 | 1100 |
| | 10 | 27 | 2 | 3 | — | 68 | 100 | 88 | 43 | 1095 |
| | 11 | 21 | 2 | — | 10 | 67 | 100 | 88 | 43 | 1095 |
| Comparative example | 1 | 10 | 2 | — | — | 88 | 100 | 88 | 43 | 1090 |
| | 2 | 40 | 2 | — | — | 58 | 100 | 88 | 43 | 1090 |
| | 3 | 23 | 0.5 | — | — | 76.5 | 100 | 88 | 27 | 1100 |
| | 4 | 23 | 7 | — | — | 70 | 100 | 88 | 85 | 1100 |
| | 5 | 15 | 2 | — | — | 83 | 100 | 35 | 43 | 1095 |
| | 6 | 30 | 1 | — | — | 69 | 100 | 126 | 43 | 1095 |
| | 7 | 21 | 3 | — | — | 76 | 100 | 88 | 5 | 1105 |
| | 8 | 21 | 7 | — | — | 72 | 100 | 88 | 133 | 1105 |
| | 9 | 15 | 2 | — | — | 83 | 100 | 35 | 43 | 1070 |
| | 10 | 15 | 2 | — | — | 83 | 100 | 35 | 43 | 1120 |

After analyzing these sintered oil-impregnated bearings through metallographic observation and SEM-EDX, it was confirmed that each of the sintered oil-impregnated bearings of examples 1 to 11 of the invention had, at least on a bearing surface, a metal structure with copper being melted therein; had, in a matrix, pearlite or a pearlite with ferrite being partially scattered therein; had, in the matrix, a copper-rich phase arranged in a mesh-like manner; and had a free graphite dispersed and distributed in the matrix. As for comparative examples 1 to 10, it can be understood that either one of the material component range, the metal structure on the bearing surface with copper being melted therein, the area ratio of the copper-rich phase or the area ratio of the free graphite is beyond the scope(s) of the examples of the present invention.

A wear test was then performed on each of these ring-shaped sintered oil-impregnated bearings thus obtained, under a high-load condition. A SUS420J2 quenched steel-made shaft having an outer diameter of 8 mm was then inserted into the ring-shaped sintered oil-impregnated bearing, followed by rotating the shaft at a rate of 50 m/min for 200 hours while applying a load of 100 kgf thereto from outside the ring-shaped bearing. Later, a wear resistance evaluation was carried out by measuring a maximum wear depth in a sliding surface of the ring-shaped bearing.

As for each specimen, the component composition, porosity, area ratios of the copper-rich phase and free graphite, and wear depth in the bearing after the wear test are shown in Table 2. Particularly, the area ratios of the copper-rich phase and the free graphite were obtained as follows.
Calculation of Area Ratio of Copper-Rich Phase The bearing was cut, and a cutting surface thereof was then polished, followed by using a 1% nital corrosion solution to perform an etching treatment thereon. A metal structure photograph (color photograph by optical microscope) of such cutting surface of the specimen was then obtained. A 2 mm grid frame was then laid on top of the metal structure photograph to calculate the area ratio of the copper-rich phase by a grid method. The examples thereof are shown in FIG. 1A and FIG. 1B.

Figure 1A:
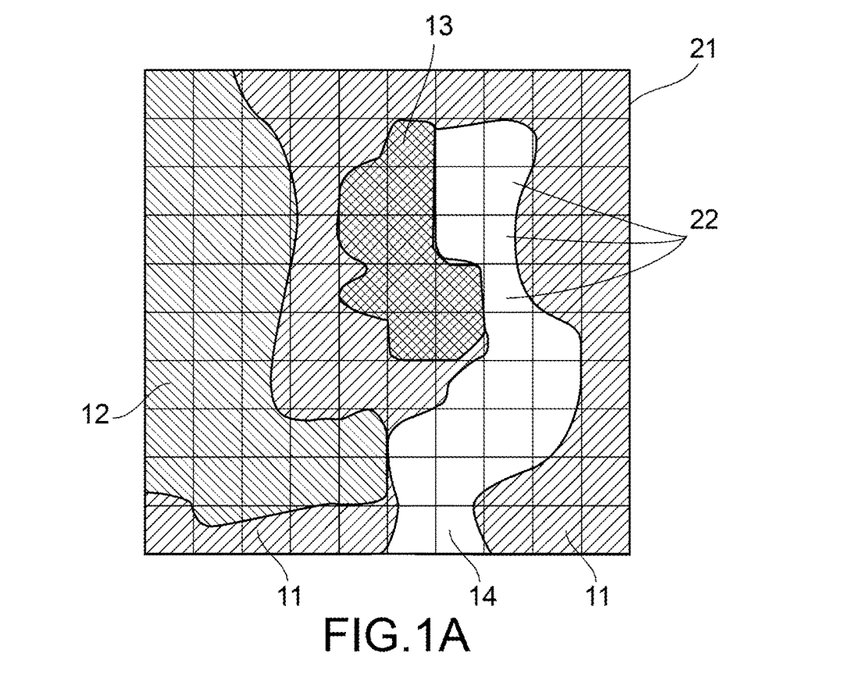
FIG. 1A is a schematic diagram for explaining a method for measuring an area ratio of a copper-rich phase i.e. a diagram showing a measurement state.

FIG. 1A shows a patternized metal structure photograph of the cutting surface of the bearing, in which there can be seen a copper region 11 of the copper-rich phase; an iron region 12 of pearlite or ferrite as an iron structure; a graphite region 13 of graphite; and a pore region 14 of pores. Here, there is shown an example where a frame 21 laid on top of the metal structure photograph is that having grids 22 arranged in 10 grids×10 grids in the vertical and horizontal directions. Further, as for the copper region 11, the iron region 12, the graphite region 13 and the pore region 14, a type of region that occupies the largest area in each grid 22 is counted as a part of such region. A ratio of the copper region 11 occupying regions other than the pore region 14 is calculated, and defined as the area ratio of the copper region 11.

Figure 1B:
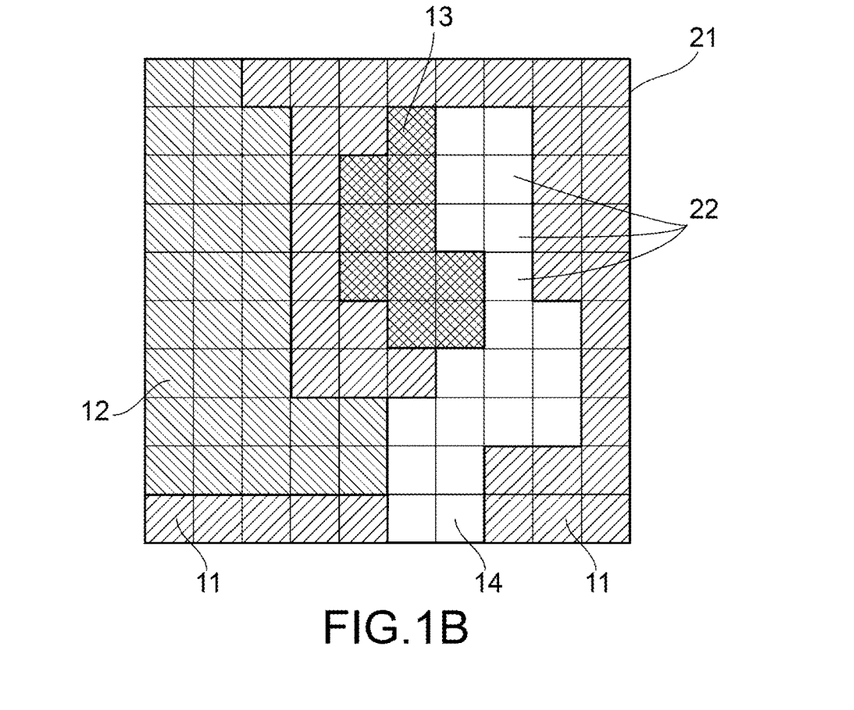
FIG. 1B is another schematic diagram for explaining the method for measuring the area ratio of the copper-rich phase i.e. a diagram showing grids being painted in different ways.

For the sake of explanation, FIG. 1B shows a diagram with the grids 22 being painted in different ways in accordance with the regions 11, 12, 13 and 14. In this example, the numbers of the grids 22 are such that there are 40 grids for the copper region 11, 30 grids for the iron region 12, 10 grids for the graphite region 13, and 20 grids for the pore region 14. Since the area ratio of the copper region 11 occupying regions other than the pore region 14 is regarded as the area ratio of the copper-rich phase, the area ratio of the copper-rich phase is 40/80×100=50%.

Figure 2:
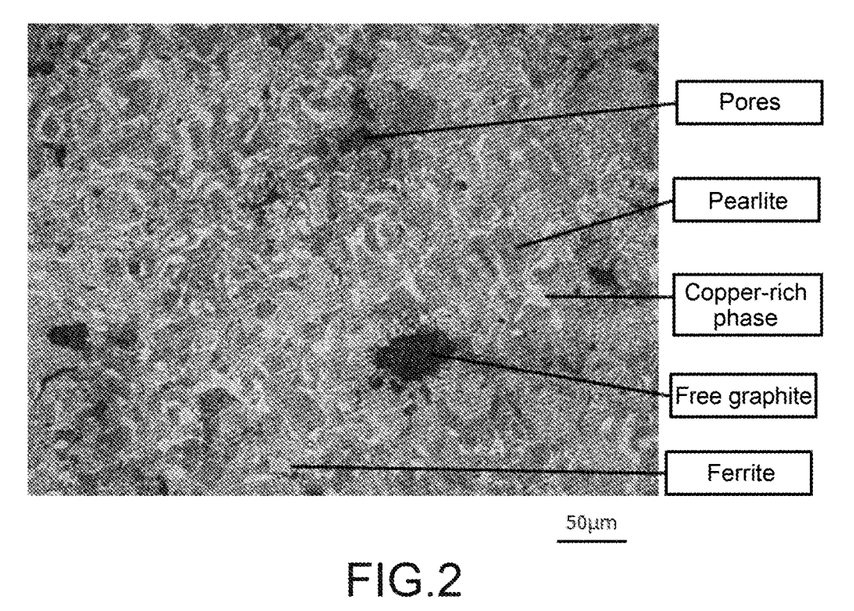
FIG. 2 is a metal structure photograph of a cutting surface of a sintered oil-impregnated bearing in an example of the present invention.
Figure 3:
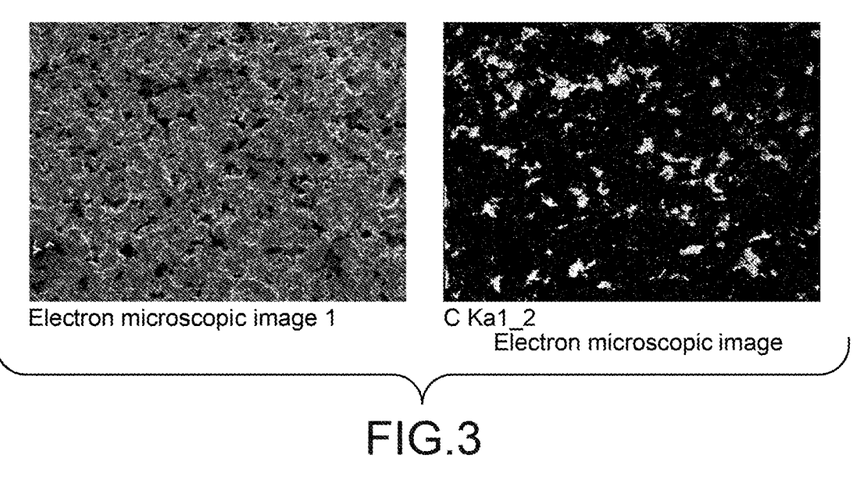
FIG. 3 includes an electron micrograph of an inner diameter surface of the sintered oil-impregnated bearing in the example of the present invention; and a mapping photograph of a free graphite therein.

As an example, shown in FIG. 2 is a metal structure photograph of a cutting surface of a sintered oil-impregnated bearing of an example of the present invention.
Measurement of Area Ratio of Free Graphite With regard to an inner diameter surface of the bearing, SEM-EDX was used to take an electron micrograph thereof at 100-fold magnification; and a mapping photograph of the free graphite therein. An example thereof is shown in FIG. 3. By comparing the electron micrograph with the mapping photograph of the free graphite, it can be seen that the back portions in the electron micrograph other than those corresponding to pores match the white portions in the mapping photograph of the free graphite, which indicates that the white portions in the mapping photograph of the free graphite represent the free graphite. The area ratio of the free graphite was then obtained by performing an image analysis on such mapping photograph of the free graphite.

TABLE 2

| Bearing | | Component Composition (% by mass) | | | | | Porosity % | Copper-rich phase Area ratio % | Free graphite Area ratio % | Maximum abrasion depth of bearing μm | Abrasion depth of mating shaft μm |
|---|---|---|---|---|---|---|---|---|---|---|---|
| | | Cu | C | Sn | Zn | Fe | | | | | |
| Example of the invention | 1 | 14.8 | 3.9 | — | — | Remainder | 27 | 7 | 22 | 9 | 2.3 |
| | 2 | 17.2 | 2.7 | — | — | Remainder | 27 | 10 | 14 | 7 | 2.2 |
| | 3 | 18.9 | 2.2 | — | — | Remainder | 23 | 13 | 10 | 7 | 2.7 |
| | 4 | 20.7 | 3.0 | — | — | Remainder | 23 | 15 | 15 | 3 | 1.7 |
| | 5 | 22.5 | 1.9 | — | — | Remainder | 25 | 16 | 10 | 4 | 1.2 |
| | 6 | 24.8 | 1.9 | — | — | Remainder | 21 | 18 | 12 | 2 | 1.5 |
| | 7 | 25.1 | 1.9 | — | — | Remainder | 12 | 19 | 13 | 3 | 1.1 |
| | 8 | 26.6 | 3.8 | — | — | Remainder | 30 | 21 | 25 | 5 | 0.8 |
| | 9 | 29.9 | 1.0 | — | — | Remainder | 16 | 25 | 5 | 8 | 1.7 |
| | 10 | 26.7 | 2.1 | 2.9 | — | Remainder | 23 | 21 | 11 | 5 | 2.5 |
| | 11 | 20.9 | 2.0 | — | 3.2 | Remainder | 23 | 17 | 10 | 7 | 2.2 |
| Comparative example | 1 | 9.9 | 1.9 | — | — | Remainder | 23 | 4 | 8 | 83 | 4.6 |
| | 2 | 40.0 | 2.0 | — | — | Remainder | 23 | 33 | 10 | 37 | 1.2 |
| | 3 | 22.7 | 0.5 | — | — | Remainder | 23 | 15 | 0.2 | 55 | 6.8 |
| | 4 | 22.9 | 7.2 | — | — | Remainder | 23 | 17 | 32 | 28 | 3.1 |
| | 5 | 14.9 | 2.1 | — | — | Remainder | 23 | 4 | 9 | 64 | 4.5 |
| | 6 | 29.8 | 1.1 | — | — | Remainder | 23 | 29 | 5 | 49 | 3.6 |
| | 7 | 20.9 | 0.9 | — | — | Remainder | 23 | 14 | 2 | 36 | 4.4 |
| | 8 | 21.0 | 6.8 | — | — | Remainder | 23 | 15 | 35 | 33 | 2.5 |
| | 9 | 14.8 | 1.7 | — | — | Remainder | 22 | 14 | 10 | 15 | 1.8 |
| | 10 | 14.8 | 1.8 | — | — | Remainder | 25 | 4 | — | 18 | 12 |

As is clear from the test results on the maximum wear depth of the bearing, it was confirmed that under a severe test condition(s) involving a high-load condition, the bearings in the examples of the present invention had superior wear resistances as compared to the bearings in the comparative examples.

Component Analysis of Copper-Rich Phase

Figure 4:
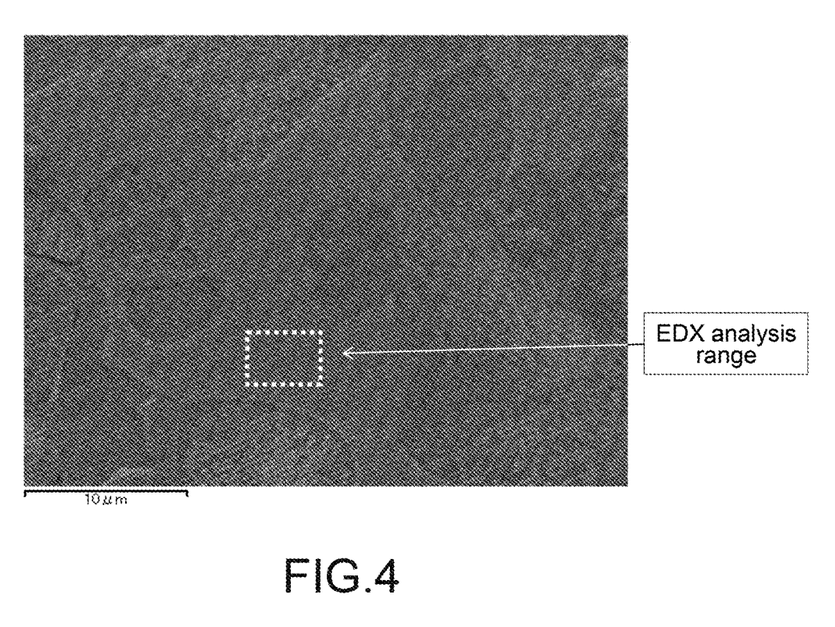
FIG. 4 is an electron micrograph showing a range for performing quantitative analysis on a copper-rich phase in an example of the present invention.

The cutting surface of a bearing in an example 3 of the present invention was polished for structure observation, and was subjected to an etching treatment with a 2% nital, thereby obtaining a specimen for structure observation in which the copper-rich phase, pearlite and the like are exposed on the surface. In a range shown in FIG. 4, SEM-EDX was then used to perform quantitative analysis on the copper-rich phase on the cutting surface of this bearing. Particularly, a SEM accelerating voltage at that time was 20 kV. The analysis results were C: 3.69% by mass, Fe: 6.41% by mass, Cu: 89.9% by mass.

The invention claimed is:

1. A sintered oil-impregnated bearing comprising:
   15 to 30% by mass of Cu;
   1 to 4% by mass of C;
   optionally at least one of Sn or Zn in an amount of not larger than 4% by mass; and
   Fe and inevitable impurities as a remainder, wherein
   a metal structure is provided on a surface of the bearing, said metal structure containing melted copper,
   a pearlite or the pearlite with ferrite scattered therein, a copper-rich phase and a free graphite are all provided in the bearing,
   the copper-rich phase contains 85% by mass or more of Cu, or 85% by mass or more of Cu and Sn or Zn, and
   raw material powders of the bearing include a copper powder having an average particle size of 50 to 100 μm.

2. The sintered oil-impregnated bearing according to claim 1, wherein the copper-rich phase is distributed in the bearing such that the copper-rich phase surrounds the pearlite.

3. The sintered oil-impregnated bearing according to claim 1, wherein the copper-rich phase is dispersed and distributed in the bearing at an area ratio of 7 to 25%.

4. The sintered oil-impregnated bearing according to claim 1, wherein the free graphite is dispersed and distributed in the bearing at an area ratio of 5 to 25%.

5. The sintered oil-impregnated bearing according to claim 1, having a porosity of 12 to 30%.

* * * * *